US011323262B2

(12) United States Patent
Zawierka (10) Patent No.: US 11,323,262 B2
(45) Date of Patent: May 3, 2022

(54) METHOD AND SYSTEM FOR VERIFYING A VOTER THROUGH THE USE OF BLOCKCHAIN VALIDATION

(71) Applicant: Paul Zawierka, New York, NY (US)

(72) Inventor: Paul Zawierka, New York, NY (US)

( * ) Notice: Subject to any disclaimer, the term of this patent is extended or adjusted under 35 U.S.C. 154(b) by 697 days.

(21) Appl. No.: 16/351,979

(22) Filed: Mar. 13, 2019

(65) Prior Publication Data

US 2019/0288846 A1  Sep. 19, 2019

Related U.S. Application Data

(60) Provisional application No. 62/642,351, filed on Mar. 13, 2018.

(51) Int. Cl.
*H04L 9/32* (2006.01)
*G06F 16/182* (2019.01)
*G06Q 30/00* (2012.01)
*G07C 13/00* (2006.01)

(52) U.S. Cl.
CPC ........ *H04L 9/3231* (2013.01); *G06F 16/1824* (2019.01); *G06Q 30/00* (2013.01); *G07C 13/00* (2013.01); *G06Q 2230/00* (2013.01); *H04L 2209/38* (2013.01)

(58) Field of Classification Search
CPC . H04L 9/3231; H04L 2209/38; H04L 9/3239; H04L 9/3247; H04L 2209/463; G06F 16/1824; G06Q 30/00; G06Q 2230/00; G07C 13/00
See application file for complete search history.

(56) References Cited

U.S. PATENT DOCUMENTS

| 6,081,793 A * | 6/2000 | Challener ............. H04L 9/3234 |
| | | 713/180 |
| 11,100,743 B1 * | 8/2021 | Sealy ................... H04L 9/3247 |
| 2006/0085647 A1 * | 4/2006 | Neff ..................... H04L 9/3013 |
| | | 713/180 |
| 2012/0053997 A1 * | 3/2012 | Garfinkle ............... H04L 63/08 |
| | | 235/386 |
| 2014/0172517 A1 * | 6/2014 | Chaum .................. G07C 13/00 |
| | | 705/12 |
| 2016/0027229 A1 * | 1/2016 | Spanos ................. G07C 13/00 |
| | | 705/51 |

(Continued)

*Primary Examiner* — Darren B Schwartz
(74) *Attorney, Agent, or Firm* — Andrew Morabito (57) ABSTRACT

The present invention is a method for authenticating a voter and casting their vote comprising: receiving, a voter's identification information, wherein the identification information is associated with a voter's account, processing, the voter's identification information in relation to governing bodies requirements for a voter's eligibility, encrypting, a portion of the voter's identification information and storing the encrypted portion of the voter's identification information and the remaining portion of non-encrypted voter's identification information in a block of a blockchain, receiving, a request from the voter account to cast a vote, accessing, the voter's account, receiving, a vote from the voter's account, wherein the vote is accompanied by a signature of the voter account, and indexing, a first portion of the vote data in a block in an encrypted format, and a second portion of the vote data in a block in a non-encrypted format in the block chain.

20 Claims, 4 Drawing Sheets

(56) References Cited

U.S. PATENT DOCUMENTS

| | | | |
|---|---|---|---|
| 2017/0109955 A1* | 4/2017 | Ernest | H04L 9/3073 |
| 2018/0077122 A1* | 3/2018 | Hoss | G06F 16/27 |
| 2018/0102013 A1* | 4/2018 | Spanos | H04L 9/14 |
| 2018/0232526 A1* | 8/2018 | Reid | H04L 9/3239 |
| 2019/0051079 A1* | 2/2019 | Venkataraman | H04L 9/3234 |

* cited by examiner

METHOD AND SYSTEM FOR VERIFYING A VOTER THROUGH THE USE OF BLOCKCHAIN VALIDATION

CROSS REFERENCE TO RELATED APPLICATIONS

This Application claims the benefit of U.S. Provisional Application No. 62/642,351, filed Mar. 13, 2018. The disclosure of this prior application is considered part of this application and is hereby incorporated by reference in its entirety.

BACKGROUND

This disclosure relates generally digital security related to signing a petition, and more specifically to authenticating the voter through a blockchain or digital infrastructure.

The following description includes information that may be useful in understanding the present invention. It is not an admission that any of the information provided herein is prior art or relevant to the presently claimed invention, or that any publication specifically or implicitly referenced is prior art.

The growth of the Internet has fueled a technological revolution in the United States, but that revolution has largely left untouched elections for political office. The few locations that have welcomed technology have seen it underperform, leaving election divisions with electronic voting machines that are costly to maintain and vulnerable to cyberattacks. Holding elections is costly and time-consuming for voters and government alike; and yet, we hold so many of them that scholars have coined the term "voter fatigue" to describe the horrendous voter turnout and general lack of civic participation. Once their votes enter the "black box," citizens have no choice but to trust that their election officials will handle their ballots with due solemnity and discretion.

Online voting technology could provide a solution to these problems while providing an ease in voting, but the technology must provide a robust and secure solution, especially considering the natural suspicion citizens may have concerning the integrity of an online voting system and more recent events with interference in elections by foreign governments. Known systems embody basic data processing and natural procedures for electronic registration and voting, using well-known public key identification cryptographic systems. Known systems do not, however, provide a means to dissociate a voter's personal identification and qualification for voting from their ballot, nor do they provide a means for a voter to verify the vote they have cast well after casting their vote. These features would be a desirable part of an online voting system, because they would protect against the risks of vote buying and provide a way for a voter to audit her vote, two common risks associated with online voting systems.

Therefore, it is desired for a method, computer program, or computer system to allow a voter to vote electronically and provide an appropriate level of protection to the authentication of the voter, to both reduce fraudulent voting and reduce the ability for an individual or entity to vote multiple times.

SUMMARY

The present invention in a first embodiment, a method for authenticating a voter and casting their vote comprising: receiving, by one or more processors, a voter's identification information, wherein the identification information is associated with a voter's account; processing, by one or more processors, the voter's identification information in relation to governing bodies requirements for a voter's eligibility; encrypting, by one or more processors, a portion of the voter's identification information and storing the encrypted portion of the voter's identification information and the remaining portion of non-encrypted voter's identification information in a block of a blockchain; receiving, by one or more processors, a request from the voter account to cast a vote; accessing, by one or more processors, the voter's account; processing, by one or more processors, the voter's account to determine if the voter account is eligible to cast a vote; processing, by one or more processors, the voter's account to determine if the voter account has previously cast a vote; receiving, by one or more processors, a vote from the voter's account, wherein the vote is accompanied by a signature of the voter account; and indexing, by one or more processors, a first portion of the vote data in a block in an encrypted format, and a second portion of the vote data in a block in a non-encrypted format in the block chain.

A computer program product for authenticating a voter and casting their vote comprising: one or more computer readable storage media and program instructions stored on the one or more computer readable storage media, the program instructions comprising: the program instructions comprising program instructions to receive a voter's identification information, wherein the identification information is associated with a voter's account, program instructions to process the voter's identification information in relation to governing bodies requirements for a voter's eligibility, program instructions to encrypt a portion of the voter's identification information and storing the encrypted portion of the voter's identification information and the remaining portion of non-encrypted voter's identification information in a block of a blockchain, program instructions to receive a request from the voter account to cast a vote, program instructions to access the voter's account, program instructions to process the voter's account to determine if the voter account is eligible to cast a vote, program instructions to process the voter's account to determine if the voter account has previously cast a vote, program instructions to receive a vote from the voter's account, wherein the vote is accompanied by a signature of the voter account, and program instructions to index a first portion of the vote data in a block in an encrypted format, and a second portion of the vote data in a block in a non-encrypted format in the block chain.

A computer system for authenticating a voter and casting their vote comprising: one or more computer processors, one or more computer readable storage media, and program instructions stored on the one or more computer readable storage media for execution by, at least one of the one or more processors, the program instructions comprising program instructions to receive a voter's identification information, wherein the identification information is associated with a voter's account, program instructions to process the voter's identification information in relation to governing bodies requirements for a voter's eligibility, program instructions to encrypt a portion of the voter's identification information and storing the encrypted portion of the voter's identification information and the remaining portion of non-encrypted voter's identification information in a block of a blockchain, program instructions to receive a request from the voter account to cast a vote, program instructions to access the voter's account, program instructions to process the voter's account to determine if the voter account is eligible to cast a vote, program instructions to process the voter's account to determine if the voter account has previously cast a vote, program instructions to receive a vote from the voter's account, wherein the vote is accompanied by a signature of the voter account, and program instructions to index a first portion of the vote data in a block in an encrypted format, and a second portion of the vote data in a block in a non-encrypted format in the block chain.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects may generally be referred to herein as a "circuit," "module", or "system." Furthermore, aspects of the present invention may take the form of a computer program product embodied in one or more computer readable medium(s) having computer readable program code/instructions embodied thereon.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements or use of a "negative" limitation.

Embodiments of the present invention discloses an approach to assist clients with their conditions in a safe and secure manner while also providing their providers with ample information to further assist the client gain control of their condition.

Figure 1:
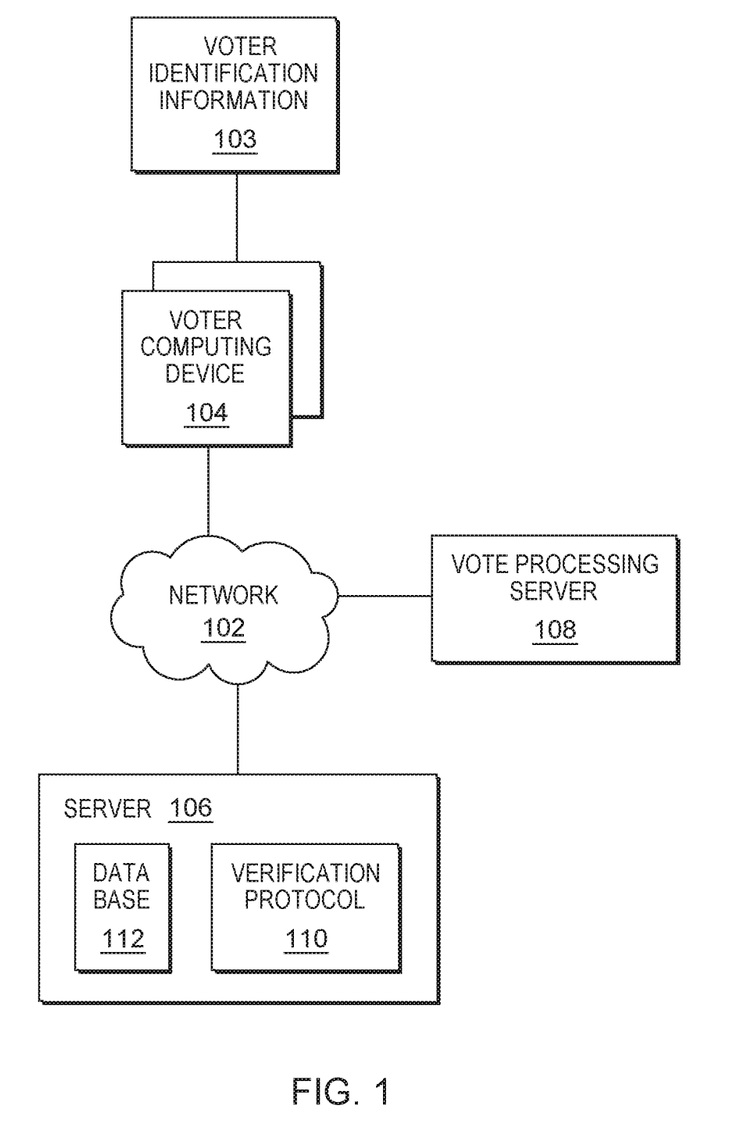
FIG. 1 depicts a block diagram depicting a computing environment, in accordance with one embodiment of the present invention.

FIG. 1 depicts a block diagram of a computing environment 100 in accordance with one embodiment of the present invention. FIG. 1 provides an illustration of one embodiment and does not imply any limitations regarding the environment in which different embodiments maybe implemented.

In the depicted embodiment, computing environment 100 includes network 102, voter computing devices 104, voter identification server 106, and petition processing client 108. Computing environment 100 may include additional servers, computers, or other devices not shown.

Network 102 may be a local area network (LAN), a wide area network (WAN) such as the Internet, any combination thereof, or any combination of connections and protocols that can support communications between voter computing devices 104, voter identification server 106, and petition processing client 108 in accordance with embodiments of the invention. Network 102 may include wired, wireless, or fiber optic connections.

Voter computing devices 104 may be a management server, a web server, or any other electronic device or computing system capable of processing program instructions and receiving and sending data. In some embodiments, voter computing devices 104 may be a laptop computer, tablet computer, netbook computer, personal computer (PC), a desktop computer, or any programmable electronic device capable of communicating with personnel computing device 106 and voter identification server 106 via network 102. In other embodiments, voter computing devices 104 may represent a server computing system utilizing multiple computers as a server system, such as in a cloud computing environment. In another embodiment, voter computing devices 104 represents a computing system utilizing clustered computers and components to act as a single pool of seamless resources. In the depicted embodiment, voter computing devices 104 access voter identification information 103. This information may be state or federal identification cards (e.g. drivers licenses) or other forms of identification information which is able to verify a voter with the governing body with whom they are attempting to electronically submit a vote to. Voter computing devices 104 may include components, as depicted and described in further detail with respect to FIG. 4.

Voter identification server 106 may be a management server, a web server, or any other electronic device or computing system capable of processing program instructions and receiving and sending data. In other embodiments voter identification server 106 may be a laptop computer, tablet computer, netbook computer, personal computer (PC), a desktop computer, or any programmable electronic device capable of communicating via network 102. In one embodiment, voter identification server 106 may be a server computing system utilizing multiple computers as a server system, such as in a cloud computing environment. In one embodiment, voter identification server 106 represents a computing system utilizing clustered computers and components to act as a single pool of seamless resources. In the depicted embodiment database 112 is located on voter identification server 106. Voter identification server 106 may include components, as depicted and described in further detail with respect to FIG. 4.

The petition processing client 108, is the governing body or agency, company, individual, or entity which is to receive the votes from the eligible parties which whom wish to vote. The petition processing client 108 has hardware, software, and/or firmware for communication across network 102. The petition processing client 108 issues the "ballots" to the voters to permit them their individual vote on the petition. The petition may be, but not limited to petitions, polls (e.g. public opinion polls), elections (e.g. local, state, federal, foreign, etc.), requests, referendums, ballots, or the like where the opinion of a group is requested. The petition processing client 108, may create the petition records either in database 112 or in a private database, defining the petitions, the petition requirements, and the voter requirements.

Verification protocol 110 operates process the voter request to submit their vote electronically, process the blockchain verification and authentication process, and confirm the submission of their vote with the petition processing client 108. In the depicted embodiment, Verification protocol 110 utilizes network 102 to access the personnel computing device 106 and the voter identification server 106 and communicates with database 112. In one embodiment, Verification protocol 110 resides on voter computing devices 104. In other embodiments, Verification protocol 110 may be located on another server or computing device, provided Verification protocol 110 has access to database 112.

Database 112 may be a repository that may be written to and/or read by Verification protocol 110. Information gathered from structured data source 110 and/or unstructured data source 112 may be stored to database 112. Such information may include previous scores, audio files, textual breakdowns, facts, events, and contact information. In one embodiment, database 112 is a database management system (DBMS) used to allow the definition, creation, querying, update, and administration of a database(s). In the depicted embodiment, database 112 resides on voter computing devices 104. In other embodiments, database 112 resides on another server, or another computing device, provided that database 112 is accessible to Verification protocol 110.

Figure 2:
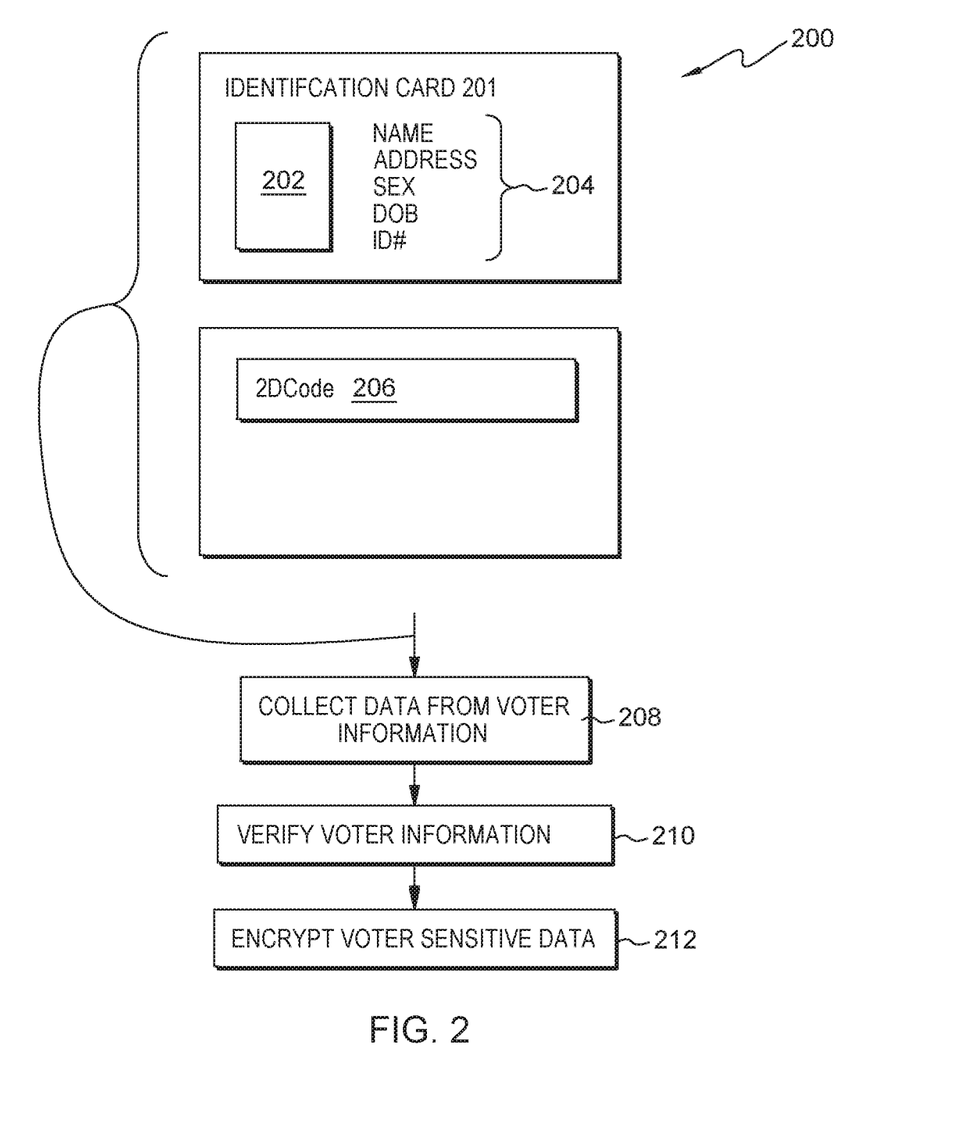
FIG. 2 depicts a flowchart of the operational steps taken to collect voter's identification information and generate the blockchain, while using a computing device within the computing environment of FIG. 1, in accordance with an embodiment of the present invention.

FIG. 2 shows block diagram 200 of a system and method for identifying and storing the identity of a person. The method(s) and associated process(es) are now discussed, over the course of the following paragraphs, with extensive reference to FIG. 2, in accordance with one embodiment of the present invention. In some embodiments, the process is performed once, periodically, continuously, at preset intervals, or upon the notification of updated voter information.

By way of example, an identification card 201 may be used. In other embodiments, other forms of identification. In the example of the identification card 201 has a photo 202, and personal data 204, which identifies the voter. The personal data 204 can include the voter's name, address and driver license number. In additional embodiments a two-dimensional code 206 may contain additional information or the personal data 204. Such coding can include PDF417 codes, QR codes, and other such codes. However, it is not necessary to have such code and the identification card may only have human-readable text strings. The identification card 201 may also take a physical or a digital form and the information can be retrieved either through scanning a code as described, performing Optical Character Recognition (OCR) on text strings, digitally transferring a digital identification card from one system to another, manually inputting the information using a keyboard, manually inputting the information using voice recognition, etc., in example embodiments.

The identification card 201 can be a government issued form of identification such as a driver license, passport, employee badge, military identification, political documentation, or the like. The identification card 201 can also be a privately issued form of identification which is acceptable for the voter processing client 108.

In step 208, the verification protocol 110 collects data from the voter information. The personal information 204 is submitted to the verification protocol 110. The inputting of the personal information 204 can take many forms, for example, a digital scanner, digital camera, or smartphone (e.g., with the camera commonly found in smartphones) for reading data from the identification card 201, including any two-dimensional codes 206 appearing on the card 201. The personal information 204 may also be manually input by a keyboard, touchscreen, voice recognition device, handwriting recognition device, or other manual input device.

In some embodiments, the verification protocol 110 continuously monitors the voter's personal information 204 to identify changes, modifications, or adjustments to the data. For example, when a voter moves to a new address or has a name change, verification protocol 110 is able to identify that the personal information 204 has been altered and is able to verify (step 210) this information. In some embodiments, verification protocol 110 may prompt the voter to supply updated information when the verification protocol 110 either has incorrect, outdates, or incomplete information. For example, when verification protocol 110 is collecting data from the Identification card 201, if part of the identification card 201 is unreadable, the voter is prompted to manually input the information, or prompted to confirm the accuracy of the information.

In some embodiments, the verification protocol 110 is configured to specify which forms of personal information to accept, which may or may not include driver's licenses, active duty and dependent military IDs, and passports. The system could be further expanded over time to accept other forms of identification, such as but not limited to finger print readers, retina scans, voice recognition or other technologies known now or in the future that may be used to verify an individual, as the online identity verification infrastructure improves. Claims are not intended to be limited to a particular document or biological voter verification technology. In some embodiments, the voter's physical address (as specified in the government-issued ID) will be indexed against a geographic information system (GIS) database in order to identify the contests for which they are eligible to participate in. Prior to the petition, petition officials will provide the GIS database.

In step 210, the verification protocol 110 verifies the collected voter information. The verification is to confirm the identity of the voter's identity and confirm the accuracy of the information. Through the verification process, the voter is identified, and cross referenced with various databases or blockchain information to confirm the identity of the voter. The verification assists in determining the limitations of the individual based on the local, state, federal, or agency guidelines to allow the individual to vote.

In some embodiments, verification protocol 110 verifies the voter information each time the information is updated, modified, altered, or adjusted. The updated voter information is compared with the previous iteration and analyzed for similarities and differences, and the differences are updated for the encryption process (step 212).

In step 212, the verification protocol 110 encrypts the voter sensitive data. The information collects, may include sensitive information which the voter desires to remain private. The verification protocol 110 is able to determine portions or sections of the collected data to encrypt separate from the information which remains non-encrypted or encrypted in a different method. For example, the voter's name and DOB may remain public, but their ID #and address may be encrypted. The voter's data is stored in various forms and in various databases or locations. For example, the voter's data may be stored in a block of a block chain database.

In some embodiments, the voter's data is hashed to provide or generate a hash value. The hash value is generated by an algorithm. In an example embodiment, the verification protocol 110 consist of one or more hashing algorithms, e.g., a Secure Hash Algorithm (SHA) algorithm. In some embodiments, the verification protocol 110 pushes the hash value to generate a digital signature on the hash value, which is accessible through the use of a key which is special to the voter.

In one embodiment, the verification protocol 110 then passes the signed hash value and the public key to the voter computing device 104 (e.g., a graphical user interface or GUI). The voter may need to access the verification protocol 110 through various encryption, hashing, or digital signature logics integrated into the verification protocol 110. The voter is able to access the information and manually update the information is there are changes to their information. If information is updated, the verification protocol 110 is able to verify or cross reference the changes to the voter's information with various databases to confirm the accuracy of the information. The voter personal information may be stored with the voter processing server 108 or may be stored in database 112.

In one embodiment, database 112 or the storage device of the voter processing server 108 can take the form of a block chain or any other public or private distributed database. A block chain, as is known in the art, is a system that enables voters' access to securely store data in a public place. The data is deemed secure, as each time data is written, the written data is dependent on previously written data, which includes performing cryptographic hash operations. A benefit of using a block chain is that once data is written to the block chain and a block chain transaction is created, that transaction remains intact, and can be verified in the future. The reason for this, is that data is continually written to the block chain, e.g., after a particular transaction is made, and that later data is dependent on an earlier particular transaction. Consequently, by writing data to a public storage facility that implements a public block chain, later verification of that data is practically ensured to be correct. With each update of the voter's personal information 204, the blockchain is updated and maintains the most current information related to the voter. This assists the voter processing server 108 to confirm the identity of the voter and reduce the ability of voter fraud and multiple instances of voting by a single voter.

In some embodiments, where modifications are made to the voter's information, and the verification protocol 110 is unable to confirm the accuracy of the information, the verification protocol 110 may deny the modifications, or may flag the voter's data. Flagged voters may remain in an unverified state until the information can be verified by an approved party or agency.

Figure 3:
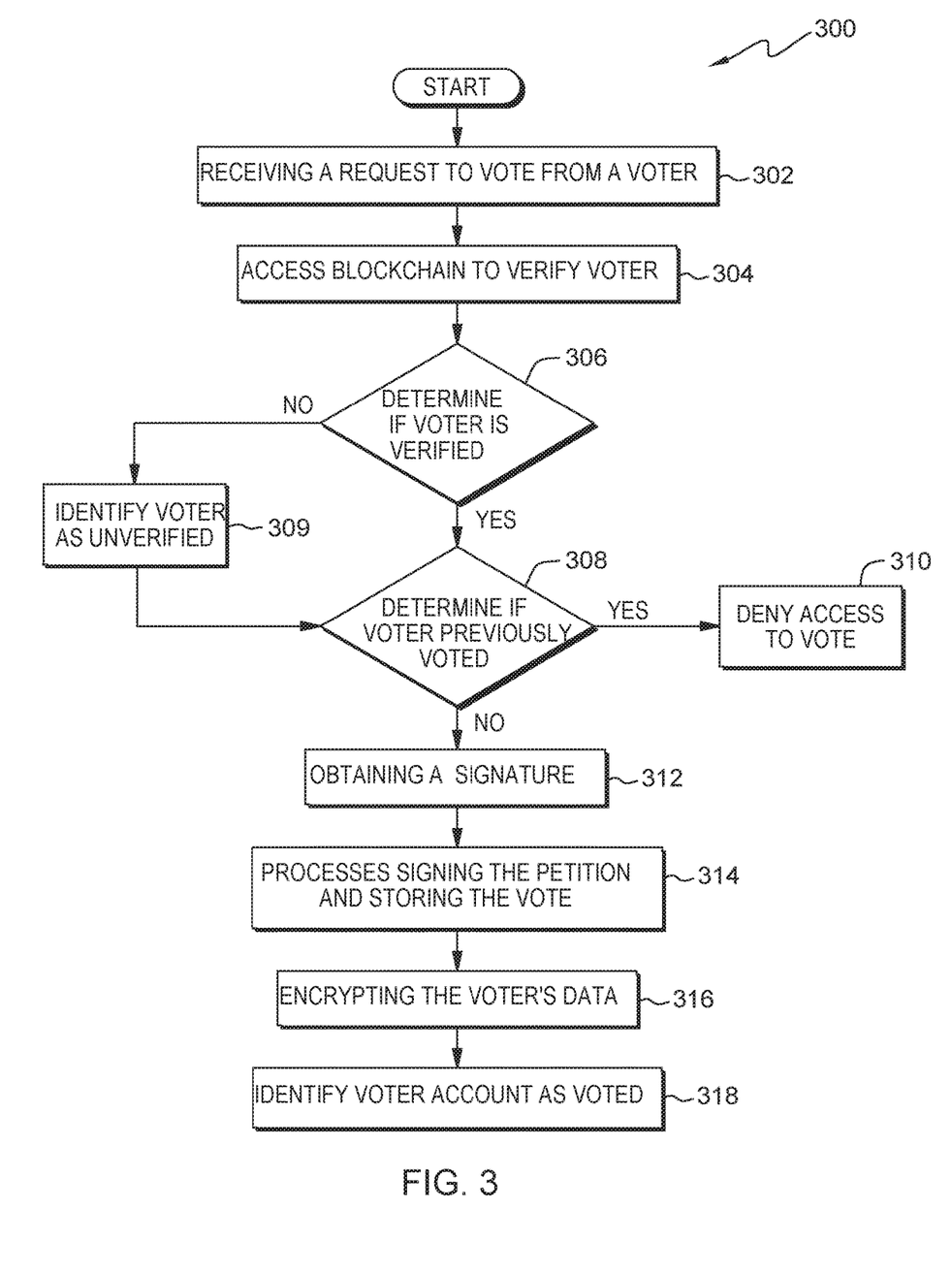
FIG. 3 depicts a flowchart of the operational steps taken to authenticate a voter and process their vote through a blockchain using a computing device within the computing environment of FIG. 1, in accordance with an embodiment of the present invention.

FIG. 3 shows a flowchart 300 of a system and method for verifying the voter's ability to vote. The method(s) and associated process(es) are now discussed, over the course of the following paragraphs, with extensive reference to FIG. 3, in accordance with one embodiment of the present invention.

In step 302, the verification protocol 110 receives a request from the voter to vote on a petition. The request is received by the verification protocol 110, and the verification protocol 110 accesses the voter's data.

In step 304, the verification protocol 110 access the blockchain to gain access to the voter's data 204. Through the release process based on the type of data, the encryption process, and the type blockchain design, the verification protocol 110 accesses the data, and performs the necessary process, with the provided (if necessary) decryption information. In some embodiments, the verification protocol 110 confirms that a certification record exists on the block chain and can process the unencrypted data.

In one embodiment, the verification protocol 110 seeks access to voter's data stored in the blockchain. In order to receive access, a process may include creating keys and unique addresses to store the keys. There may be public and private keys generated by the blockchain or a PKI and stored in the blockchain. The voters computing device 104 may be registered and as subsequent access attempts are made, the stored credential may be retrieved from the blockchain and forwarded to the verification protocol 110. A decrypted message response may indicate the proper credentials which can be verified so access can be provided.

In another embodiment, the method of managing authentication in the blockchain, the method may include storing a public key and one or corresponding addresses associated with a voter data in a blockchain, creating a credential for the voter profile based on a public key, forwarding the credential to the verification protocol 110 or the voter computing device 104, receiving a request for access to a site from a voter computing device 104 associated with the voter, and retrieving the credential based on the one or more addresses from the blockchain.

In some embodiments, the method of authenticating the voter data may include storing a public key and one or corresponding addresses associated with the voter in the blockchain, receiving a biometric data sample associated with the voter, extracting one or more biometric elements from the biometric data, creating a credential for the voter profile based on the public key and the one or more biometric elements, storing the credential in the blockchain, receiving a request for access to a site from a voter device associated with the voter, retrieving the credential from the blockchain, and authorizing the request for access to the site.

In decision 306, the verification protocol 110 determines if the voter is verified. In an example embodiment, the verification performed in step 210 generates an acknowledgment record, which exists in the block chain with the data. In additional embodiments, the voter provides the verification protocol 110 with the proper credentials to access the blockchain data. Which the verification protocol 110 provides to the voter processing server 108 to determine the authenticity of the voter. The voter is then determined to be able to vote on the petition they are requesting if they meet the requirements of the voter processing server 108. This may be citizenship, age, residence, date of request, or the like. If the verification protocol 110 receives confirmation from the voter processing server 108 that the voter is verified (YES branch), the verification protocol 110 determines if the voter has previously voted. If the verification protocol 110 receives denial that the voter is not verified from the voter processing server 108 (NO branch), the verification protocol 110 identifies the voter as an unverified voter.

In some embodiments, a voter may transition between verified and unverified after they have voted on a petition. The verification protocol 110 stores the data associated with the status of the voter after their vote has been cast and monitors the voter's status. If the voter transitions from either verified to unverified or unverified to verified, the verification protocol 110 is able to update the voter's status. For example, a voter may transition from verified to unverified if they change their name, address, or other aspects of their ID. In some embodiments, the verification protocol 110 is able to update the block associated with the voter with the updated information. Through this process there is a documented history of the modifications to the voter's information. Wherein this information can be analyzed the history of voter. Through the verification protocol 110 ability to analyze the history of the block, in conjunction with machine learning or artificial intelligence, the verification protocol 110 is able to determine if the voter is verified based on the changes in their information. For example, a voter who constantly changes their address, may cause the verification protocol 110 to flag the voter's account as unverified until additional information is collected to verify the voter.

In some additional embodiments, the verification protocol 110 is able to analyze a new voter registering with the verification protocol 110 and review the block chain material to determine if in fact the voter is verified or is an unverified account based on the history of voter's block information.

The voter is able to transfer from verified to unverified an indefinite number of times based on the voter's information, the current laws and regulations in place at the time, and the verification protocol's 110 specific requirements.

The status of the voters is used to identify the percentage or quantity of the voters which are legitimate accounts, and which are potentially fraudulent accounts, or accounts which are outside of the jurisdiction of the petition's coverage. This verification process assists with identify voters who are actual people and not fake or BOT accounts attempting to sway the petition in a certain direction.

In some embodiments, the block chain, have certified that the voter is authorized to vote on a petition in a specific block within the block chain which is non-encrypted, and the information related to the candidate or the stance is encrypted. This allows easy access from third party sources to determine the casting of a vote.

In decision 308, verification protocol 110 determines if the voter has previously voted on the requested petition. Through accessing the voter processing server 108, the verification protocol 110 is able to receive confirmation of the voter having previously voted on the present petition. The voter processing server 108, is also is inform the verification protocol 110 that the voter has or has not voted on the present petition. This is vital to reducing voter fraud and providing a documented process to verify the voter's identity and voting history. Through the verification protocol 110 accessing the voter's data stored in the blockchain, and the various authentication and certifications stored in and with the blockchain, the verification protocol 110 is able to update the block chain data with the determination of the voter's action history. If it is determined that the voter has not previously voted (NO branch), the verification protocol 110 processes through to receive the voter's signature. If it is determined through the verification protocol 110 that the voter has previously voted (YES branch), the verification protocol 110 denies access to vote.

In some embodiments, the verification protocol 110 obtaining a historical block identifier from a voter's blockchain representative of specific data with respect to the voter. The historical identifier preferably represents a link to the voter's account. The historical identifier could comprise a hash value of a previous block header, possibly the last block added. Such an approach is considered advantageous because the hash value incorporates all previously processed blocks, which mitigates the risk of fraud by participants that seek to inject erroneous information. In such cases the block identifier represents a link of continuity across all blocks in the chain.

In step 309, the verification protocol 110 identifies the voter as an unverified voter. The voter is still granted the permission to vote on the petition (if permitted based on other requirements), however the voter is identified as being unverified. The status of unverified is based on a variety of different situations. For example, one situation is where the voter is a foreigner to an election. In another example, the voter may have an incomplete account and the account data is not complete to meet the requirements of a verified voter. In yet another embodiment, the voter may have submitted their vote after a deadline, but the vote is still counted by the verification protocol 110.

In step 310, the verification protocol 110 obtains the signature from the voter. Through a user interface or other electronic means, the verification protocol 110 receives a signature from the voter to vote based on local, state, or federal guidelines. In some embodiments, this may be a signature, biometric data, or other forms of signatures to gain verification of the voter's knowledge of who they are voting for, or the petition they are signing.

In some embodiments, the votes are anonymization to accomplish a blinded submission process. The verification protocol 110 waits a random period of time before proceeding with submitting the vote. After the random time delay, the verification protocol 110 generates the voter's vote and sends it to the predetermined destination. The random time delay may act to aid in ballot anonymization in scenarios.

In step 312, the verification protocol 110 obtains a signature from the voter. In the process of collecting the signature or signing of the petition (depending on the signing process). The verification protocol 110 collects the signature data. The signature data may be, but not limited to, the actual signature of the voter, a time or date of the signature, a location (through a global positioning system) of the voter at the time of voting, the information used to verify the voter from step 304.

In step 314, the verification protocol 110 sends the casted vote of the voter to all servers and database, as well as the block-chain to provide the confirmation that the vote was cast by the voter. The storing of the voter's decision in an encrypted format, eliminating the possibility of a voter casting a counted vote either online or offline. Moreover, the voter cannot vote at a second polling location, as the stored data would indicate that a vote has been cast by the specific voter upon the attempt to vote either in person or through the online protocol.

The signature/vote can be received over a network, via a web service, through an API call, or other techniques through which data can be exchanged. For example, in a peer-to-peer network, the validation device can receive a broadcast from a peer device where the broadcast comprises a vote, perhaps in a JSON, WL, or YAML format. The vote represents the voter s decision on the specific matter (e.g. local, state, federal elections, petitions, or agencies).

In step 316 the verification protocol 110 encrypted the voter's data. By encrypting all or a portion of the voter's vote, this creates a blind vote, wherein a portion of the vote is encrypted and requires verification to access (e.g. whom the person voted for), while the information associated with the casting of the vote is public. Once the voter makes their selection, the verification protocol 110 creates a "blind" vote to submit. The "blind" vote is a redacted portion of the voter's data which meet and fulfil the requirements of the petition to process the vote.

In step 318, the verification protocol 110 identifies the voter account as having cast their vote. By incorporating in the block or database that the voter has cast their vote. The voter is unable to vote a second or third time. The processing of the vote creates a set of data which disallows the voter from voting a second or more times on the petition or to stop repeated voting. Through the updating of the voter data, a traceable history of the voter's actions is able to be processed to determine if the voter has previously voted. In some instances, the voter may be able to redact their vote if allowed based on the petition type, and the redacted vote is recorded in the database or blockchain.

In some embodiments, if the voter wishes to revoke their vote online and so that they may vote at the physical location. The voter would generate a signed transaction to redact their vote, so the signed transaction may be presented at the physical location, and the set of data would be processed so that when the physical voting is completed the data is updated accordingly to void the previous online vote. The physical vote data is submitted to the blockchain, then issues a paper ballot, which the voter may use to vote in the traditional manner.

In the preceding description, various aspects of the electronic voting system and method have been described. For purposes of explanation, specific numbers, systems and/or configurations were set forth to provide a thorough understanding of the methods described herein. However, it should be apparent to one skilled in the art having the benefit of this disclosure that methods described herein may be practiced with other system components and/or architecture. Similarly, using the specific systems taught herein, other methods may be practiced within the scope and spirit of the electronic voting methods taught herein. In some instances, features that would be understood by one of ordinary skill were omitted or simplified so as not to obscure the disclosure. While certain features have been illustrated or described herein, many modifications, substitutions, changes or equivalents will now occur to those skilled in the art. It is, therefore, to be understood that claims are intended to cover all such modifications or changes as fall within the true spirit of claimed subject matter.

Figure 4:
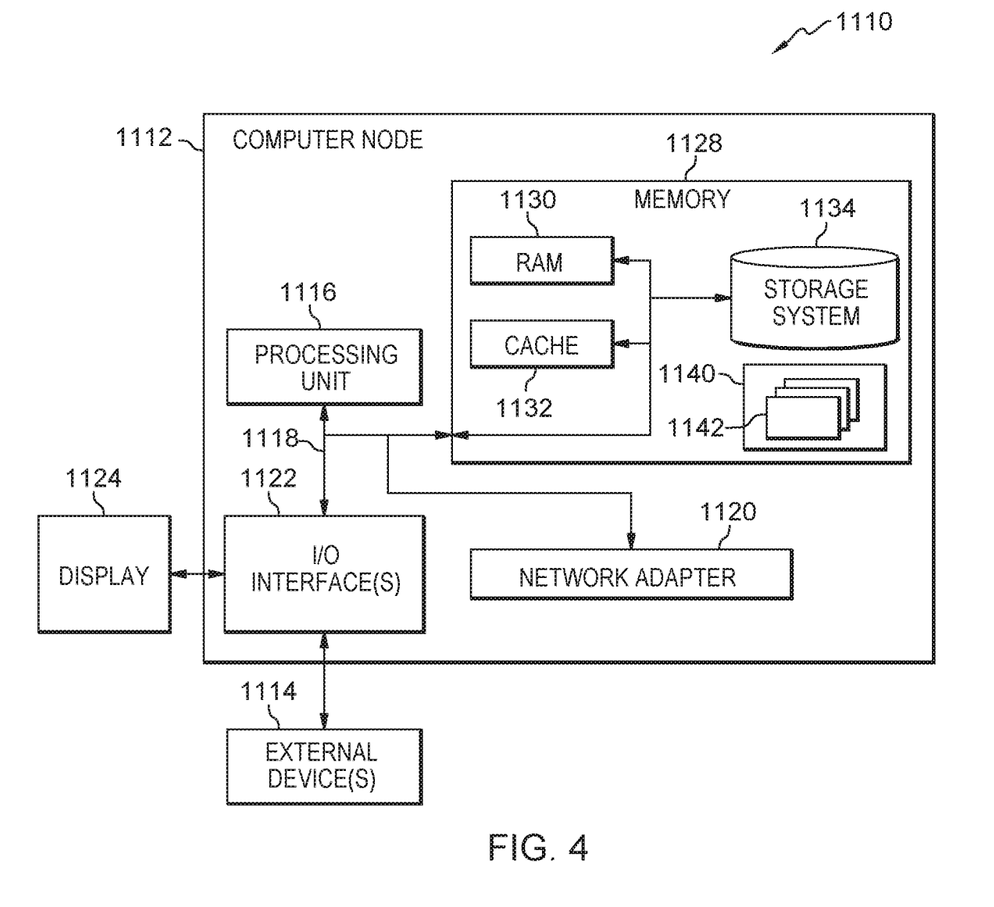
FIG. 4 depicts a block diagram depicting the internal and external components of the server of FIG. 1, in accordance with one embodiment of the present invention.

Referring now to FIG. 4, a schematic of an example of a computing node is shown. computing node 1110 is only one example of a suitable computing node and is not intended to suggest any limitation as to the scope of use or functionality of embodiments of the invention described herein. Regardless, computing node 1110 is capable of being implemented and/or performing any of the functionality set forth hereinabove.

In computing node 1110 there is a computer system/server 1112, which is operational with numerous other general purposes or special purpose computing system environments or configurations. Examples of well-known computing systems, environments, and/or configurations that may be suitable for use with computer system/server 1112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 1112 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1112 may be practiced in distributed computing environments where tasks are performed by remote processing devices that are linked through a communications network. In a distributed computing environment, program modules may be located in both local and remote computer system storage media including memory storage devices.

As shown in FIG. 4, computer system/server 1112 in computing node 1110 is shown in the form of a general-purpose computing device. The components of computer system/server 1112 may include, but are not limited to, one or more processors or processing units 1116, a system memory 1128, and a bus 1118 that couples various system components including system memory 1128 to processor 1116.

Bus 1118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1112 typically includes a variety of computer system readable media. Such media may be any available media that is accessible by computer system/server 1112, and it includes both volatile and non-volatile media, removable and non-removable media.

System memory 1128 can include computer system readable media in the form of volatile memory, such as random-access memory (RAM) 1130 and/or cache memory 1132. Computer system/server 1112 may further include other removable/non-removable, volatile/non-volatile computer system storage media. By way of example only, storage system 1134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

In such instances, each can be connected to bus 1118 by one or more data media interfaces. As will be further depicted and described below, memory 1128 may include at least one program product having a set (e.g., at least one) of program modules that are configured to carry out the functions of embodiments of the invention.

Program/utility 1140, having a set (at least one) of program modules 1142, may be stored in memory 1128 by way of example, and not limitation, as well as an operating system, one or more application programs, other program modules, and program data. Each of the operating system, one or more application programs, other program modules, and program data or some combination thereof, may include an implementation of a networking environment. Program modules 1142 generally carry out the functions and/or methodologies of embodiments of the invention as described herein.

Computer system/server 1112 may also communicate with one or more external devices 1114 such as a keyboard, a pointing device, a display 1124, etc.; one or more devices that enable a user to interact with computer system/server 1112; and/or any devices (e.g., network card, modem, etc.) that enable computer system/server 1112 to communicate with one or more other computing devices. Such communication can occur via Input/output (I/O) interfaces 1122. Still yet, computer system/server 1112 can communicate with one or more networks such as a local area network (LAN), a general wide area network (WAN), and/or a public network (e.g., the Internet) via network adapter 1120. As depicted, network adapter 1120 communicates with the other components of computer system/server 1112 via bus 1118. It should be understood that although not shown, other hardware and/or software components could be used in conjunction with computer system/server 1112. Examples, include, but are not limited to microcode, device drivers, redundant processing units, external disk drive arrays, RAID systems, tape drives, and data archival storage systems, etc.

In certain embodiments, the server computer 1100 has the architecture of computing node 1110. In certain embodiments, the server computer 1100 is part of an environment. In certain alternative embodiments, the server computer 1100 is not part of an environment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Commercial applications may include those that require commercial entities to verify a user's identity. Verifying a user's identity can be required for achieving any number of functions, such as traveling, making transactions, banking, communication, loan verification, credit verification, purchase verification, and other uses. Private identity verification can also be facilitated using the methods, apparatus, computer readable media, and systems described herein. Private identity verification may be useful when a user wishes to prove to another user their identity, in a fast and efficient manner. The systems described herein, as described above, utilize methods that write data to the block chain database, which is non-rewritable and permanently maintains the record without compromise. This enables writing of information to the block chain in a manner that can be verified by one or more transactions executed by methods of the present inventions.

In some embodiments, the verification systems can be embodied in an application, such as those that can be installed on mobile devices (e.g., Apps). By way of example, users wishing to have their identity verified can use an App to seal information regarding their identity. Once the data has been sealed, and encrypted data has been stored to the block chain, this data can be used for later certification by another party. The other party may also be utilizing a corresponding App, which enables efficient reading of the data, code, QR code, message, or notification, to validate the identity of the user.

What is claimed is:

1. A method for authenticating a voter and casting their vote comprising:
    receiving, by one or more processors, a voter's identification information, wherein the identification information is associated with a voter's account;
    processing, by one or more processors, the voter's identification information in relation to governing bodies requirements for a voter's eligibility;
    encrypting, by one or more processors, a portion of the voter's identification information and storing the encrypted portion of the voter's identification information and the remaining portion of non-encrypted voter's identification information in a block of a blockchain;
    receiving, by one or more processors, a request from the voter's account to cast a vote;
    accessing, by one or more processors, the voter's account;
    processing, by one or more processors, the voter's account to determine if the voter's account is eligible to cast a vote;
    processing, by one or more processors, the voter's account to determine if the voter account has previously cast a vote;
    receiving, by one or more processors, the vote from the voter's account, wherein the vote is accompanied by a signature of the voter's account; and
    indexing, by one or more processors, a first portion of the vote data in the block in an encrypted format, and a second portion of the vote data in the block in a non-encrypted format in the blockchain.

2. The method for authenticating a voter and casting their vote of claim 1, further comprising:
    requesting, by one or more processors, biometric data associated with the voter's account, wherein the biometric data accompanies the signature.

3. The method for authenticating a voter and casting their vote of claim 1, wherein the received vote of the voter's account, incorporates global positioning and time stamped data of the vote.

4. The method for authenticating a voter and casting their vote of claim 1, further comprising:
    delaying, by one or more processors, the submission of the vote a predetermined time period.

5. The method for authenticating a voter and casting their vote of claim 1, further comprising:
    establishing, by one or more processors, at least one credential, to access the voter's identification information, and cast votes.

6. The method for authenticating a voter and casting their vote of claim 1, further comprising:
    assigning, by one or more processors, data to the block associated with the voter's account completed vote.

7. The method for authenticating a voter and casting their vote of claim 1, further comprising:
    receiving, by one or more processors, a request to redact the casted vote;
    verifying, by one or more processors, a casted vote can be redacted;
    redacting, by one or more processors, the casted vote associated with the voter's account; and
    storing, by one or more processors, the redacted casted vote of the voter account with the block associated with the voter account.

8. The method for authenticating a voter and casting their vote of claim 1, further comprising:
    receiving, by one or more processors, adjusted the voter's identification information
    comparing, by one or more processors, the adjusted the voter's identification information to the original voter's identification information; and
    identifying, by one or more processors, differences between the adjusted voter's identification information and the original voter's identification information.

9. The method for authenticating a voter and casting their vote of claim 8, further comprising;
  verifying, by one or more processors, the adjusted voter's identification information, wherein if the adjusted voter's identification information is not verified the voter's account is identified as unverified.

10. A computer program product for authenticating a voter and casting their vote comprising:
  one or more computer readable storage media and program instructions stored on the one or more computer readable storage media, the program instructions comprising:
  program instructions to receive a voter's identification information, wherein the identification information is associated with a voter's account;
  program instructions to process the voter's identification information in relation to governing bodies requirements for a voter's eligibility;
  program instructions to encrypt a portion of the voter's identification information and storing the encrypted portion of the voter's identification information and the remaining portion of non-encrypted voter's identification information in a block of a blockchain;
  program instructions to receive a request from the voter's account to cast a vote;
  program instructions to access the voter's account;
  program instructions to process the voter's account to determine if the voter's account is eligible to cast a vote;
  program instructions to process the voter's account to determine if the voter's account has previously cast a vote;
  program instructions to receive a vote from the voter's account, wherein the vote is accompanied by a signature of the voter's account; and
  program instructions to index a first portion of the vote data in the block in an encrypted format, and a second portion of the vote data in the block in a non-encrypted format in the blockchain.

11. The computer program product for authenticating a voter and casting their vote of claim 10, further comprising;
  program instructions to request biometric data associated with the voter's account, wherein the biometric data accompanies the signature.

12. The computer program product for authenticating a voter and casting their vote of claim 10, wherein the received vote of the voter's account, incorporates global positioning and time stamped data of the vote.

13. The computer program product for authenticating a voter and casting their vote of claim 10, further comprising;
  program instructions to delay the submission of the vote a predetermined time period.

14. The computer program product for authenticating a voter and casting their vote of claim 10, further comprising;
  program instructions to establish at least one credential, to access the voter's identification information, and cast votes.

15. The computer program product for authenticating a voter and casting their vote of claim 10, further comprising;
  program instructions to receive a request to redact the casted vote;
  program instructions to verify a casted vote can be redacted;
  program instructions to redact the casted vote associated with the voter's account; and
  program instructions to store the redacted casted vote of the voter's account with the block associated with the voter's account.

16. A computer system for authenticating a voter and casting their vote comprising:
  one or more computer processors, one or more computer readable storage media, and program instructions stored on the one or more computer readable storage media for execution by, at least one of the one or more processors, the program instructions comprising:
  program instructions to receive a voter's identification information, wherein the identification information is associated with a voter's account;
  program instructions to process the voter's identification information in relation to governing bodies requirements for a voter's eligibility;
  program instructions to encrypt a portion of the voter's identification information and storing the encrypted portion of the voter's identification information and the remaining portion of non-encrypted voter's identification information in a block of a blockchain;
  program instructions to receive a request from the voter's account to cast a vote;
  program instructions to access the voter's account;
  program instructions to process the voter's account to determine if the voter's account is eligible to cast a vote;
  program instructions to process the voter's account to determine if the voter's account has previously cast a vote;
  program instructions to receive a vote from the voter's account, wherein the vote is accompanied by a signature of the voter's account; and
  program instructions to index a first portion of the vote data in the block in an encrypted format, and a second portion of the vote data in the block in a non-encrypted format in the blockchain.

17. The computer system for authenticating a voter and casting their vote of claim 16, further comprising;
  program instructions to receive an adjusted voter's identification information
  program instructions to compare the adjusted voter's identification information to the original voter's identification information; and
  program instructions to identify differences between the adjusted voter's identification information and the original voter's identification information.

18. The computer system for authenticating a voter and casting their vote of claim 17, further comprising;
  program instructions to verify the adjusted voter's identification information, wherein if the adjusted voter's identification information is not verified the voter's account is identified as unverified.

19. The computer system for authenticating a voter and casting their vote of claim 16, wherein the voter's identification information is substantially continuously monitored for alterations.

20. The computer system for authenticating a voter and casting their vote of claim 16, wherein voter's identification information is stored in the block of a blockchain, and program instructions to review previous iterations of the voter's identification information.

* * * * *